United States Patent [19]

Baubles

[11] Patent Number: 4,790,701
[45] Date of Patent: Dec. 13, 1988

[54] FLOATING FASTENER RETAINER ASSEMBLY WITH REMOVABLE FASTENERS

[75] Inventor: Richard C. Baubles, Maplewood, N.J.

[73] Assignee: Jacobson Mfg. Co., Inc., Kenilworth, N.J.

[21] Appl. No.: 47,139

[22] Filed: May 8, 1987

[51] Int. Cl.⁴ ............................ F16B 27/00; E04B 1/38
[52] U.S. Cl. .................................... 411/85; 411/107; 411/121; 411/177; 411/112; 52/710
[58] Field of Search ................ 411/84, 85, 87, 88, 411/90-95, 103, 107, 112, 111, 177, 352, 353, 999; 52/708-710

[56] References Cited

U.S. PATENT DOCUMENTS

| | | |
|---|---|---|
| 2,144,553 | 1/1939 | Simmonds . |
| 2,299,158 | 10/1942 | Luce . |
| 2,381,233 | 8/1945 | Summers . |
| 2,395,650 | 2/1946 | Allen . |
| 2,469,312 | 5/1949 | Poupitch . |
| 2,633,886 | 4/1953 | Tinnerman ........................ 411/112 |
| 3,164,191 | 1/1965 | Grimm et al. . |
| 3,259,165 | 7/1966 | Tobin et al. . |
| 3,695,324 | 10/1972 | Gulistan . |
| 4,488,844 | 12/1984 | Baubles . |
| 4,571,135 | 2/1986 | Martin et al. . |

FOREIGN PATENT DOCUMENTS 152580 12/1950 Australia ............................ 411/112
2421357 11/1975 Fed. Rep. of Germany ...... 411/112

*Primary Examiner*—Neill R. Wilson
*Attorney, Agent, or Firm*—Richard L. Cannaday; Frank J. DeRosa

[57] ABSTRACT

A fastener assembly for floatingly retaining or captivating at least one fastener is disclosed. The fastener assembly includes a flexible channel member with discrete projections extending from opposed flange portions towards each other and at least one fastener having a base which is captivated between the discrete projections and a web portion of the channel member. The projections extending from at least one flange portion are configured to present a camming surface to a fastener base as it is being inserted into the channel member through the opening between opposed projections to cause the channel member to elastically flex and to move at least one flange portion outwardly to permit the fastener base to be seated in the channel member through the opening. The projections are further configured to present removal of the fastener base from the channel member through the opening as long as the channel member remains unflexed.

24 Claims, 2 Drawing Sheets

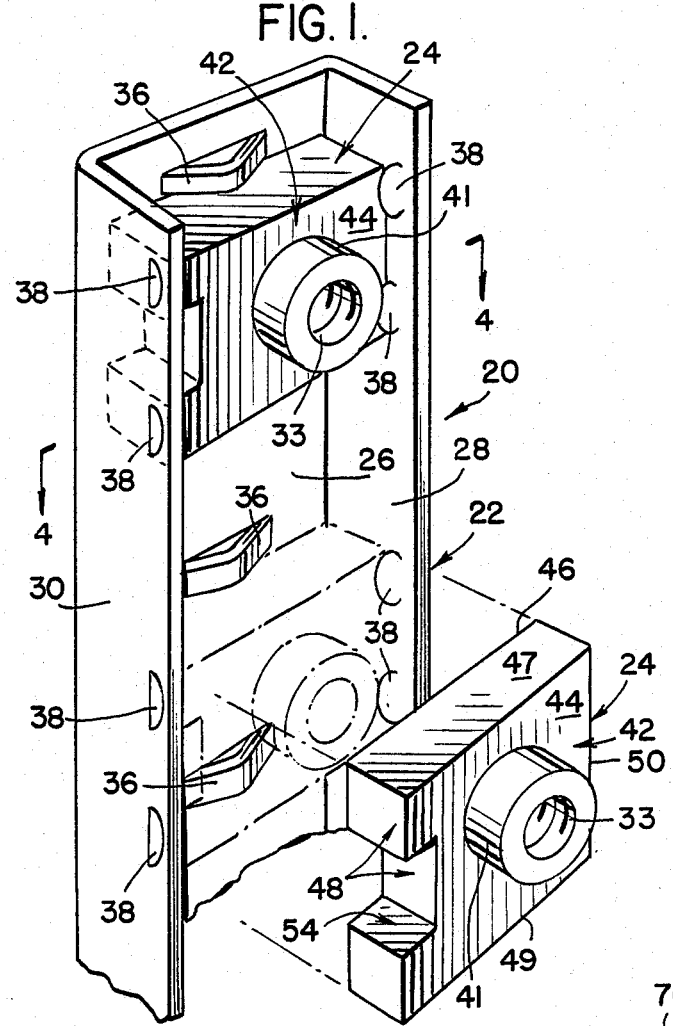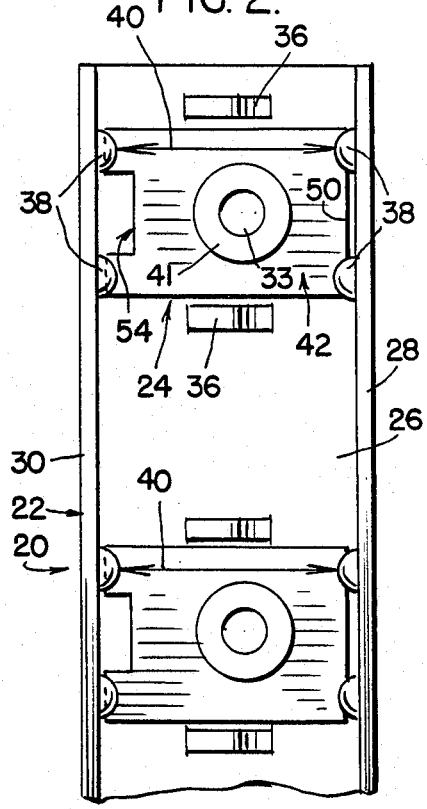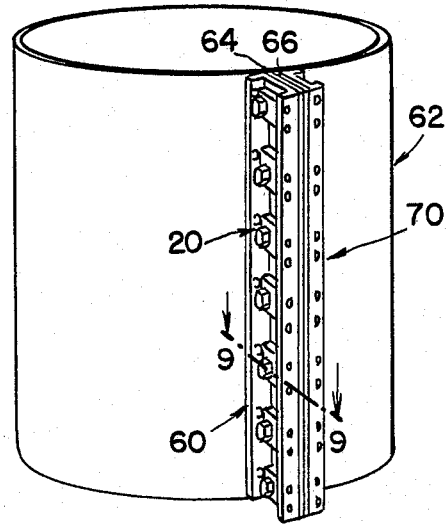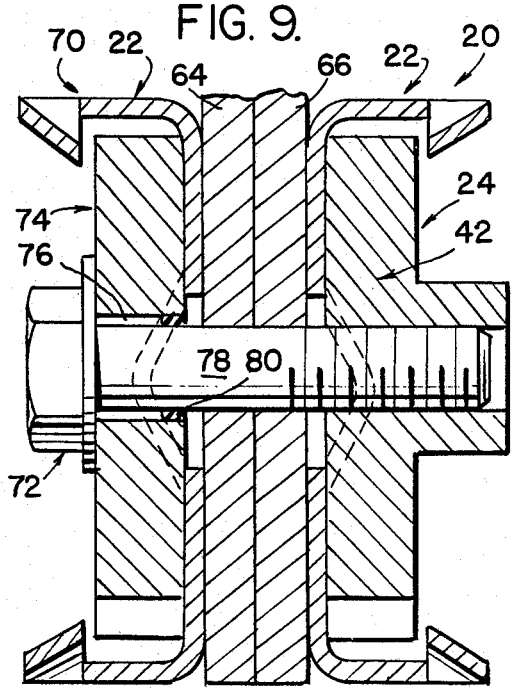

FLOATING FASTENER RETAINER ASSEMBLY WITH REMOVABLE FASTENERS

BACKGROUND OF THE INVENTION

The present invention relates to a retainer assembly for at least one fastener, for example, a nut or a bolt, in which the fastener is floatingly retained or captivated within a channel member, and to a clamping system which includes complementary fastener retainer assemblies.

Nut and bolt retainers in which the nuts or bolts are captivated or held in a channel member with one or more directions of limited movement relative thereto are known in the prior art. For example, my prior U.S. Pat. No. 4,488,844, which issued Dec. 18, 1984, discloses a floating fastener retainer assembly including a channel member having a web portion and two spaced flange portions extending from the same side of the web portion. Each of the flange portions has an edge turned in toward the opposite flange portion so that the inturned flange edges define an opening into the channel member. The channel member and the base of each fastener are sized so that each fastener base when positioned in the channel member between the web portion and the flange portions and beneath the inturned flange edges is floatingly captivated and can not be removed through the opening between the inturned flange edges while the channel member is unflexed.

In order to facilitate insertion of fastener bases into the channel member through the opening between the inturned flange edges, each fastener base is configured, as disclosed in my above-mentioned U.S. Patent, to include an inclined portion on at least one of the side surfaces thereof which faces a flange portion when the fastener base is captivated in the channel member. The flexibility of the channel member, the size of the opening between the inturned flange edges, the size of the fastener base and the inclined portion of each fastener base side enable the respective fastener base to be inserted into the channel member through the opening between the inturned flange edges when the channel member is flexed. A slot in the side of each fastener base, which may be engaged by the tip of a screwdriver, facilitates removal of the fastener base through the opening between the inturned flange edges upon flexing of the channel member by the screwdriver.

OBJECTS AND SUMMARY OF THE INVENTION

It is an object of the present invention to provide a floating fastener retainer assembly which can be manufactured relatively easily at low cost.

It is another object of the present invention to provide a clamping system comprising complementary floating fastener retainer assemblies which can be manufactured relatively easily at low cost.

In accordance with the present invention, there is provided a fastener assembly including at least one floatingly captivated fastener, the assembly comprising a channel member having a web portion and spaced flange portions extending from the same side of the web portion, and for each captivated fastener, at least one discrete projection extending from at least one of the flange portions over the base of a captivated fastener towards the other flange portion. Each fastener base and the channel member (including at least one discrete projection for each fastener) are configured and sized so that the respective fastener base can be captivated in the channel member (when unflexed) between the flange portion thereof below at least one respective discrete projection with limited movement of the respective fastener base relative to the channel member.

Each discrete projection extending from at least one of the flange portions for captivating a respective fastener is configured and sized and the flange portions are sized for facilitating insertion of the fastener base into the channel member through an opening thereto between a projection or projections on one flange portion and the opposed flange portion (when projections are provided on only one flange portion) or between projections on opposite flange portions (when projections are provided on both flange portions).

Thus, each projection extending from at least one of the flange portions over a respective captivated fastener base is configured and positioned to both facilitate insertion of a fastener base into the channel member through the opening thereto and captivate the fastener base in the channel member, i.e. prevent the fastener base from simply falling through the opening or from simply being lifted out of the channel member through the opening. Further, the fastener base is configured for facilitating its removal from the channel member through the opening thereto.

In one embodiment of the fastener assembly, for each fastener to be captivated, at least one projection extends from each flange portion into the opening to the channel member, the opening being defined by the space between the projections on opposite flange portions. Each projection extending from at least one of the flange portions over a captivated fastener base is configured to act as a camming surface for a fastener base being inserted into the channel member which causes elastic flexing of the channel member so that at least one of the flange portions moves outwardly sufficiently to allow the fastener base to be inserted into the channel member beneath the projections through the opening to the channel member. In a preferred embodiment, for each fastener to be captivated, two projections extend from each flange portion towards the other flange portion, and the projections extending from at least one of the flange portions are tapered or sloped, linearly or arcuately, so that they are thicker nearer the web portion of the channel member. The sloped surfaces each act as the above mentioned camming surface by means of which the base of the fastener elastically flexes the channel member so that at least one of the flange portions moves outwardly as the fastener base is inserted into the channel member through the opening thereto.

The fastener base, which is defined by opposed sides, is inserted into the channel member by disposing one side of the base between the projections extending from one flange portion and the web portion, and resting the opposite side of the fastener base on the sloped surfaces of the projections extending from the opposite flange portion. Thereafter, the fastener base is pressed towards the web portion with a relatively small force, which causes a camming action between the fastener base and the tapered projections in contact therewith to elastically flex the channel member so that at least one of the flange portions moves outwardly a distance sufficient for the fastener base to clear the projections.

The configuration of the fastener base which facilitates its removal from the channel member through the opening thereto preferably includes structure which can be engaged by an implement such as the tip of a screwdriver, for example. The implement is pivoted to then also engage it with one of the flange portions and further pivoted to elastically flex the channel member so that at least the engaged flange portion moves outwardly a distance sufficient for the base of the fastener to clear the projections extending from that flange portion. The fastener base is then pivoted by the implement so that one end moves out of the channel member thereby freeing the fastener from captivation. The structure associated with the fastener base for facilitating removal takes, in one embodiment, the form of a cut-out or slot in a side of the fastener base facing a flange portion when the fastener is captivated.

According to the invention, complementary fastener assemblies as described above may be provided as a clamping system for clamping two adjacently-positioned objects together. One complementary fastener assembly may be, for example, a nut retainer assembly and the other a bolt retainer assembly.

The above and other objects, features, aspects and advantages of the invention will be more readily perceived from the following description of the preferred embodiments of the invention taken in conjunction with the accompanying drawings and appended claims.

BRIEF DESCRIPTION OF THE DRAWINGS

The present invention is illustrated by way of example and not limitation in the figures of the accompanying drawings in which like references indicate like parts, and in which:

FIG. 1 is a partially exploded, front perspective view of a portion of a nut retainer assembly according to the invention;

FIG. 2 is a top plan view of the portion of the nut retainer assembly depicted in FIG. 1;

FIG. 8 is a side perspective view of complementary fastener retainer assemblies clamping two longitudinal edges of a split cylinder; and FIG. 9 is a cross-sectional view on an enlarged scale of the complementary fastener retainer assemblies depicted in FIG. 8 taken along line 9—9 in FIG. 8.

DESCRIPTION OF THE PREFERRED EMBODIMENTS

Figure 3:
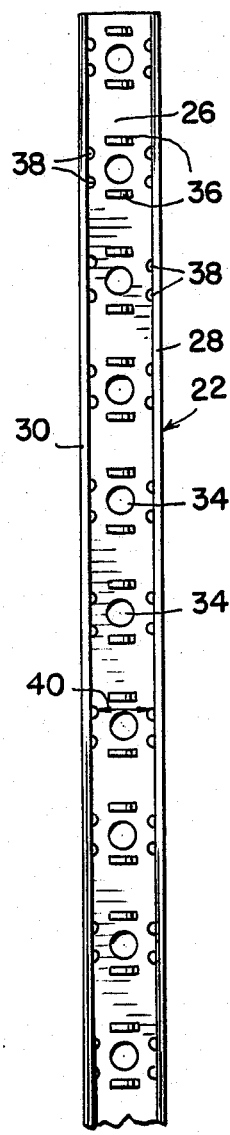
FIG. 3 is a top plan view on a reduced scale of the channel member of the nut retainer assembly depicted in FIG. 1.
Figure 6:
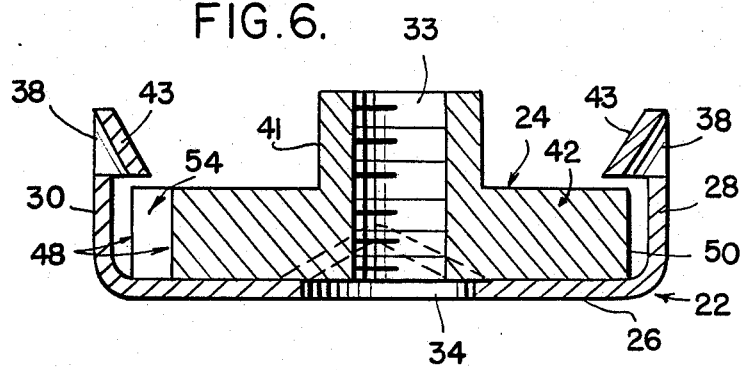
FIG. 6 is a cross-sectional view similar to that of FIG. 4 depicting the nut after it has been seated in the channel member of the nut retainer assembly.

Referring now to the drawings in detail and specifically to FIGS. 1-3 there is shown an illustrative embodiment of the invention in the form of a nut retainer assembly 20. Nut retainer assembly 20 includes a channel member 22 and nuts 24 captivated therein as depicted in FIGS. 1, 2, and 6. Channel member 22 includes a web portion 26 and two confronting spaced apart flange portions 28 and 30 extending from the same side of web portion 26. Nuts 24 each include an elongated threaded hole 33 which may receive the threaded shank of a respective bolt (not shown) passing through a respective hole 34 (FIGS. 3 and 6) in web portion 26. For each nut 24 to be captivated, web portion 26 includes two lances or tabs 36 (FIG. 3), one on each side of the captivated nut (FIG. 2). Pairs of lances 36 are associated with each hole 34 in web portion 26, one on each side of a respective hole as depicted in FIG. 3. The lances of a pair are spaced to limit movement of nuts 25 longitudinally within the channel member 22 (see FIG. 2) while providing alignment of the holes 33 in nuts 24 with the holes 34 in web portion 26 (FIG. 6).

Flange portions 28 and 30 each have, for each nut 24 to be captivated, two discrete projections 38 extending towards the other flange portion. In that embodiment, the opening 40 (FIG. 2) to the channel member extends between a pair of opposed projections 38. Projections 38 are preferably formed by inwardly projecting lances or tabs in the flange portions which can be made when channel member 22 is manufactured, or can be made using conventional methods subsequent to manufacture of a smooth continuous channel member 22. Although two pairs of opposed projections 38 are provided for each nut to be captivated in the embodiment depicted in the drawings, more or fewer projections in various dispositions may be employed.

While structure such as lances 36 are presently preferred for limiting longitudinal movement of nuts captivated in channel member 22, other structure may be used to accomplish that function. For example, the boss or hub 41 of threaded hole 33 of a nut may be configured to extend between and be engaged by a pair of projections 38 to longitudinally captivate the nut in the channel member while permitting limited longitudinal movement of the nut. The boss 41 of the threaded hole (see FIG. 1) may be extended towards nut side 50 opposite nut side 48 in any desired shape (e.g. rectangular or curved) to extend between a pair of projections 38. Alternatively, the holes 34 in web portion 26 of channel member 22 may be off-set to one side and holes 33 in the nuts may be correspondingly offset such that the boss 41 of hole 33 of each nut extends between a pair of projections 38 and is engaged thereby as described above. If desired, the bosses 41 of holes 33 and the off-set locations of holes 33 and 34 may cooperate to longitudinally captivate respective nuts between respective pairs of projections 38.

As depicted in FIGS. 1 and 3, when each of the bases 42 of nuts 24 is seated in the channel member 22 between adjacent tabs 36 and between the web portion 26 and projections 38, each nut 24 is "captivated" and has only limited movement in any direction. Such limited movement simplified alignment and threading of a bolt (not shown) with the nut 24.

Projections 38 are configured to facilitate insertion of nut bases 42 through opening 40 into channel member 22. In the preferred embodiment depicted in the drawings, projections 38 each include an outer surface 43 (see FIGS. 4 and 5) which generally linearly slopes downwardly towards the flange portion opposite the one that the respective projection extends from. As described in more detail below, sloping surface 43 acts as a camming surface for a nut base 42 to cause the channel member to elastically flex such that at least one of the flange portions 28, 30 moves outwardly during insertion of a nut base 42 into the channel member through opening 40. Although projections 38 are depicted in the drawings to have a generally linearly sloping camming surface 43, other configurations of projections 38 may be employed to act as a camming surface or otherwise facilitate insertion of nuts 24 into the channel member while also providing structure to captivate the nut in the channel member. Such configuration may be provided for projections on only one or both flange portions for each nut to be retained in the channel member.

Figure 4:
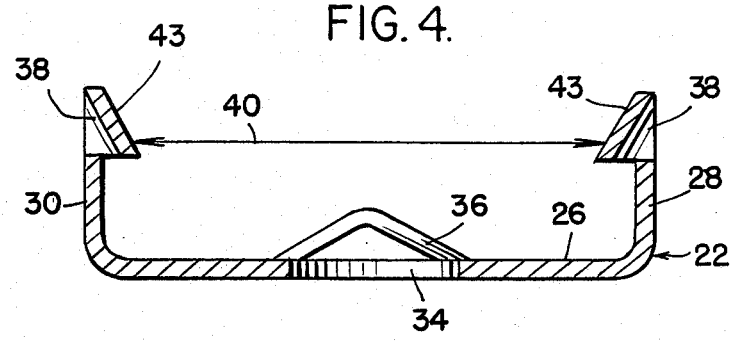
FIG. 4 is a cross-sectional view on an enlarged scale of the nut retainer assembly of FIG. 1 without a captivated nut taken along line 4—4 in FIG. 1.
Figure 5:
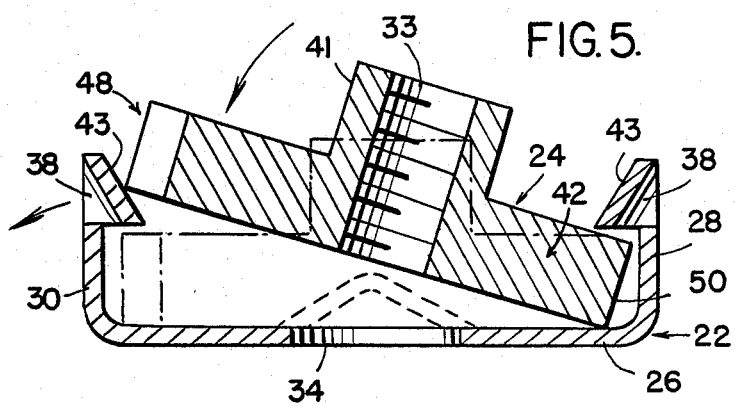
FIG. 5 is a cross-sectional view similar to that of FIG. 4 depicting insertion of a nut into the channel member of the nut retainer assembly.

Insertion of one of nut bases 42 into the channel member 22 is described below with reference to FIGS. 4, 5 and 6. The base 42 of each nut 24 (FIG. 1) is defined by opposed spaced apart faces 44 and 46 and sides 47, 48, 49 and 50. Sides 47 50 are defined broadly and refer not only to the surfaces extending between faces 44 and 46, but also to the intersections of those surfaces with faces 44 and 46, and also to the portions of faces 44 and 46 adjacent those surfaces. When seated in channel member 22 (FIG. 6), nut base side 48 and 50 face respective flange portions 30, 28. FIG. 5 shows the initial position of nut 24 for inserting it into the channel member 22. Side 50 is placed between projections 38 of flange portion 28 and web portion 26 while nut base side 48 rests on the sloped surface 43 of the projections 38 on flange portion 30. As indicated by the curved arrows in FIG. 5, a force is applied to nut base 42 which results in a camming action between the inclined surfaces 43 and the nut base to cause the channel member to elastically flex such that flange portion 30 primarily moves outwardly, thereby allowing side 48 of the nut base 42 to move below projections 38 on that flange portion.

FIG. 6 shows nut 24 subsequent to FIG. 5 after nut base 42 has been seated in channel member 22. Hole 33 in the nut 24 is generally aligned with the larger hole 34 in web portion 26 to provide access to the hole 33 from the side of the web portion opposite opening 40 thereto. It will be appreciated from the disclosure herein that the dimensions of the nut base 42, the spaces between the flange portions, the configuration and location of the projections, and the relative flexibility of the channel member are interrelated at least to a certain extent, and are selected to permit insertion of nuts into channel member 22 and captivation thereby as disclosed herein.

Figure 7:
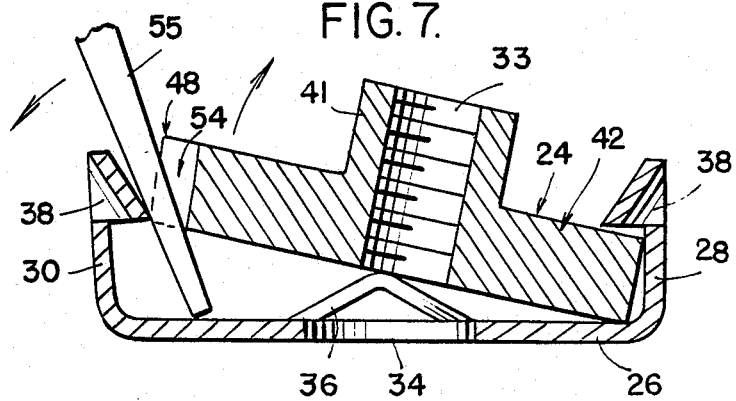
FIG. 7 is a cross-sectional view similar to that of FIG. 4 depicting removal of the nut from the channel member of the nut retainer assembly.

Nut 24 is configured to facilitate its removal from channel member 22 through opening 40. Referring to FIG. 1, a preferred configuration for this purpose includes a recessed or cut-out portion 54 in, for example, side 48. As illustrated in FIG. 7, a lever-like implement such as tip 55 of a screwdriver (shown partially) is used to pivot side 48 upwardly from web portion 26 past projections 38 on flange portion 30 as the channel member is elastically flexed to move that flange portion away from the opposite flange portion 28, thereby unseating nut base 42 from channel member 22 through opening 40 thereto.

The dimensions of the nut retainer assembly 20 depend, in part, on the materials used and the amount of floating movement which is desired or will be tolerated for nuts 24. If the channel member 22 is being used primarily to retain nuts 24 and is not intended to play a significant role in distributing forces along the length of web portion 26, then channel member 22 may be made of a relatively thin and lightweight material such as aluminum or plastic or the like. If, however, nut retainer assembly 20 will be used to provide a substantial force-distributing function, then channel member 22 is preferably made of a strong material such as iron or steel or the like. Nuts 24 may be made of plastic or metal, depending upon the end application in which nut retainer assembly 20 will be used.

FIG. 8 depicts a clamping system 60 for clamping, for example, a longitudinally split cylinder 62 having edge flanges 64 and 66 compressed between complementary fastener assemblies 20 and 70. Referring to FIG. 9, fastener assembly 20 holds nuts 24 and fastener assembly 70 holds complementary bolts 72 by means of bolt retainers 74. Bolt retainers 74 are dimensioned similar to the base 42 of nut 24. Each bolt retainer 24 has a bore 76 having a larger diameter than the shank 78 of the bolt 72. An annular washer 80 is used to frictionally retain bolt 72 in bore 76. The annular washer 80, which is of a conventional design and material and may be composed of natural or synthetic rubber or any other appropriate material, frictionally engages shank 78 of bolt 72 in bore 76 of bolt retainer 74. Although FIG. 9 shows bolt 72 captivated by means of retainer 74, a bolt (not shown) having a head configured similar to the outside of retainer 74 can be captivated directly.

Although the invention herein has been described with reference to particular embodiments, it is to be understood that those embodiments are merely illustrative of the principle and application of the invention. Thus, it is to be understood that numerous modifications may be made in the illustrated embodiments and other arrangements may be devised without departing from the spirit and scope of the invention.

Protection by Letters Patent of this invention in all its aspects as set forth in the appended claims is sought to the full extent that the prior art allows.

I claim as my invention:

1. A fastener assembly comprising:
    a channel member having a web portion and two spaced apart flange portions extending from the same side of said web portion;
    at least one fastener captivated by said channel member, each captivated fastener including a base defined by opposed sides;
    for each captivated fastener, said channel member including one or more discrete projections extending from at least one of the flange portions over the respective captivated fastener base towards the other flange portion;
    there being an opening into the channel member extending between one projection on said one flange portion and an opposed flange portion or between one projection on said one flange portion and a projection extending from the opposite flange portion depending on the number and locations of projections used for retaining each fastener;
    said channel member, said one or more discrete projections extending over a captivated fastener base and each captivated fastener base being sized such that each captivated fastener has limited movement with respect to said channel member when the base of each captivated fastener is positioned in said channel member between said web portion and respective one or more discrete projections extending from at least one of said flange portions, and such that removal of a captivated fastener base through said opening is prevented while said channel member is unflexed;
    said one or more discrete projections extending from at least one of said flange portion shaving configuration which facilitates the insertion of the base of each captivated fastener into said channel member through said opening, such that when one side of each captivated fastener base is disposed in said channel member the opposite side rests on at least one of said discrete projections having said configuration, said channel member being elastically flexible such that the application of a relatively small force to said fastener base causes elastic flexing of said channel member such that at least one flange portion moves outwardly a distance sufficient for said fastener base to clear said one or more projections extending from said one flange portion and be seated in said channel member between said web portion and said one or more discrete projections;

said fastener base further having configuration for facilitating removal of said fastener base from said channel member through said opening, said fastener base configuration being disposed adjacent at least one of said opposed sides of said fastener base which at least one side is disposed adjacent a flange portion of said channel member when said fastener base is captivated in said channel member;

for each captivated fastener, said at least one projection, if it be projecting from said flange portion adjacent said configuration of said fastener base, being sized and positioned so as to permit access to said fastener base configuration for removing said fastener base from said channel member.

2. The fastener assembly according to claim 1 wherein said fastener is a nut having a threaded bore and said web portion has a hole therein which generally registers with that threaded bore when said nut is captivated in said channel member.

3. The fastener assembly according to claim 1 wherein said fastener is a retainer for a bolt, said retainer having a bore in which the shank of said bolt is frictionally engaged, and said web portion having a hole defined therein which generally registers with that bore when retainer is captivated in said channel member.

4. The fastener assembly according to claim 1 wherein for each captivated fastener there is at least one of said discrete projections extending from each of said flange portions, said opening extending between projections on opposite flange portions, and wherein said at least one projection which is disposed adjacent said at least one of said opposed sides is sized and positioned so as to permit access to said fastener base configuration for removing said fastener base from said channel member.

5. The fastener assembly according to claim 1 wherein for each captivated fastener there are at least two projections extending from each of said flange portions, said opening extending between projections on opposite flange portions, and wherein said at least two projections which are disposed adjacent said at least one of said opposed sides are sized and positioned so as to permit access to said fastener base configuration for removing said fastener base from said channel member.

6. The fastener assembly according to claim 1 wherein said one or more discrete projections are produced from physical distortion of said flange portions.

7. The fastener assembly according to claim 1 further comprising, for each captivated fastener, tabs on said web portion spaced apart from each other to receive a fastener base therebetween while limiting longitudinal movement of each captivated fastener in said channel member.

8. The fastener assembly according to claim 1 wherein each or said one or more projections extending from at least said one flange portion is configured to present a camming surface to said fastener base opposite side.

9. The fastener assembly according to claim 1 wherein each of said one or more projections extending from at least said one flange portion is configured to have a surface sloped downwardly toward the flange portion opposite said projections.

10. A fastener assembly comprising:

a channel member having a web portion and tow spaced apart flange portions extending from the same side of said web portion;

at least one fastener captivated by said channel member, each captivated fastener including a base defined by opposed sides;

for each captivated fastener, at least one discrete projection extending from each flange portion over the respective captivated fastener base towards the other flange portion;

there being an opening into the channel member extending between two projections extending from opposite flange portions;

said channel member, said discrete projections extending from each flange portion over a cpativated fastener base and each captivated fastener base being sized such that each captivated fastener has limited movement with respect to said channel member when the base of each captivated fastener is positioned in said channel member between said web portion and respective discrete projections and such that removal of a captivated fastener base through said opening is prevented while said channel member is unflexed;

at least said discrete projection or projections extending from one flange portion over a captivated fastener base having configuration which facilitates the insertion of the base of each captivated fastener into said channel member through said opening, such that when one side of each captivated fastener base is disposed in said channel member the opposite side rests on a discrete projection or projections having said configuration, said channel member being elastically flexible such that the application of a relatively small force to said fastener base causes elastic flexing of said channel member such that at least one flange portion moves outwardly a distance sufficient for said fastener base to clear said projection or projections and be seated in said channel member between said web portion and said discrete projections;

said fastener base further having a configuration for facilitating removal of said fastener base from said channel member through said opening, said fastener base configuration being disposed adjacent at least one of said opposed sides of said fastener base which at least one side is disposed adjacent a flange portion of said channel member when said fastener base is captivated in said channel member;

for each captivated fastener, said at least one projection projecting from said flange portion adjacent said configuration of said fastener base being sized and positioned so as to permit access to said base configuration for removing said fastener base from said channel member.

11. The fastener assembly according to claim 10 wherein said configuration for facilitating removal comprises a recessed portion, the depth and extent of said recessed portion cooperating with said flange portion to define a slot adapted to receive the tip of a lever-like implement by means of which said fastener base can be pivoted out through said opening when said fastener base is positioned in said channel member, and wherein said at least one discrete projection which extends from said flange portion is sized and positioned to permit access to said slot so that said slot may receive said implement tip.

12. The fastener assembly according to claim 10 wherein for each captivated fastener there are at least two of said projections extending from each of said flange portions and wherein said configuration for facilitating removal comprises a recessed portion, the depth and exstent of said recessed portion cooperating with said flange portion to define a slot adapted to receive the tip of a lever-like implement by means of which said fastener base can be pivoted out through said opening when said fastener base is positioned in said channel member, and wherein said at least two discrete projections which extend from said flange portion are sized and positioned to permit access to said slot so that said slot may receive said implement tip.

13. The fastener assembly according to claim 10 wherein said fastener is a nut having a threaded bore and said web portion has a hole therein which generally registers with that threaded bore when said nut is captivated in said channel member.

14. The fastener assembly according to claim 10 wherein said fastener is a retainer for a bolt, said retainer having a bore in which the shank of said bolt is frictionally engaged, said web portion portion having a hole therein which generally registers with that bore when said retainer is captivated in said channel member.

15. The fastener assembly according to claim 10 wherein for each captivated fastener there are at least two of said projections extending from each of said flange portions and wherein said at least two projections which are disposed adjacent said at least one of said opposed sides are sized and positioned so as to permit access to said fastener base configuration for removing said fastener base from said channel member.

16. The fastener assembly according to claim 10 wherein said discrete projections are produced from physical distortion of said flange portions.

17. The fastener assembly according to claim 10 further comprising, for each captivated fastener, tabs on said web portion spaced apart from each other to receive a fastener base therebetween while limiting longitudinal movement of each captivated fastener in said channel member.

18. The fastener assembly according to claim 10 wherein each of said projections extending from at least one flange portion over said fastener base is configured to present a camming surface to said fastener base opposite side.

19. The fastener assembly according to claim 10 wherein each of said projections extending from at least one flange portion over said fastener base is configured to have a surface sloped downwardly toward the flange portion opposite said projections.

20. A clamping system for clamping two adjacently positioned objects together comprising first and second complementary fastener assemblies, each fastener assembly adapted to be positioned at the surface of a respective object in an opposing relationship to the other assembly and comprising:

a channel member having a web portion and two spaced apart flange portions extending from the same side of said web portion;

at least one fastener captivated by said channel member, each captivated fastener including a base defined by opposed sides, the fasteners captivated by the first and second assemblies being respectively complementary;

for each captivated fastener, one or more discrete projections extending from at least one of the flange portions over the respective captivated fastener base towards the other flange portion;

there being an opening into the channel member extending between one projection on said one flange portion and an opposed flange portion or between one projection on said one flange portion and a projection extending from the opposite flange portion depending on the number and locations of projections used for retaining each fastener;

said channel member, said one or more discrete projections extending over a captivated fastener base and each captivated fastener base being sized such that each captivated fastener has limited movement with respect to said channel member when the base of each captivated fastener is positioned in said channel member between said web portion and respective one or more discrete projections extending from at least one of said flange portions and such that removal of a captivated fastener base through said opening is prevented while said channel member is unflexed;

said one or more discrete projections extending from at least one of said flange portions having configuration which facilitates the insertion of the base of each captivated fastener into said channel member through said opening, such that when one side of each captivated fastener base is disposed in said channel member the opposite side rests on at least one of said discrete projections having said configuration, said channel member being elastically flexible such that the application of a relatively small force to said fastener base causes elastic flexing of said channel member such that at least one flange portion moves outwardly at a distance sufficient for said fastener base to clear said one or more projections extending from said one flange portion and be seated in said channel member between said web portion and said one or more discrete projections;

said fastener base further having configuration for facilitating removal of said fastener base from said channel member through said opening, said fastener base configuration being disposed adjacent at least one of said opposed sides of said base which at least one side is disposed adjacent a flange portion of said channel member when said fastener base is captivated in said channel member;

for each captivated fastener, said one or more projections projecting from said flange portion adjacent said configuration of said fastener base being sized and positioned so as to permit access to said fastener base configuration for removing said fastener base from said channel member.

21. The clamping system according to claim 20 wherein the fastener of one of the fastener assemblies is a nut having a threaded bore, said web portion of that fastener assembly having a hole therein which generally registers with that threaded bore when said nut is captivated in said channel member, and the fastener for the other fastener assembly is a bolt.

22. The clamping system according to claim 21 wherein the fastener base of said other fastener assembly comprises a retainer for captivating the bolt, the retainer having a bore which frictionally engages the shank of the bolt, said web portion of the other fastener assembly having a hole defined therein which generally registers with that retainer bore when said retainer is captivated in said channel member.

23. The fastener assembly according to claim 1 wherien said configuration for facilitating removal comprises a recessed portion, the depth and extent of said recessed portion cooperating with said flange portion to define a slot adapted to receive the tip of a lever-like implement by means of which said fastener base can be pivoted out through said opening when said fastener base is positioned in said channel member, and wherein said at least one discrete projection, if it be projecting from said flange portion, is sized and positioned to permit access to said slot so that said slot may receive said implement tip.

24. A fastener assembly comprising:
  a channel member having a web portion and two spaced apart flange portions extending from the same side of said web portion;
  at least one fastener captivated by said channel member, each captivated fastener including a base defined by opposed sides;
  for each captivated fastener, a plurality of discrete, spaced projections extending from each flange portion over the respective captivated fastener base towards the other flange portion;
  there being an opening into the channel member extending between two projections extending from opposite flange portions;
  said channel member, said discrete projections extending from each flange portion over a captivated fastener base and each captivated fastener base being sized such that each captivated fastener has limited movement with respect to said channel member when the base of each captivated fastener is positioned in said channel member between said web portion and respective discrete projections and such that removal of a captivated fastener base through said opening is prevented while said channel member is unflexed;
  said discrete projections extending at least from one flange portion over a captivated fastener base having configuration which facilitates the insertion of the base of each captivated fastener into said channel member through said opening such that when one side of each captivated fastener base is disposed in said channel member the opposite side rests on discrete projections having said configuration, said channel member being elastically flexible such that the application of a relatively small force to said fastener base causes elastic flexing of said channel member such taht at least one flange portion moves outwardly a distance sufficient for said fastener base to clear said projections and be seated in said channel member between said web portion and said discrete projections;
  said fastener base further having configuration for facilitating removal of said fastener base from said channel member through said opening, said fastener base configuration comprising a recess disposed adjacent at least one of said opposed sides of said base which at least one side is disposed adjacent a flange portion of said channel member when said fastener base is captivated in said channel member;
  for each captivated fastener, said projections projecting from said flange portion which are adjacent said recess of said fastener base being sized and spaced so as to expose and permit access to said recess for removing said fastener base from said channel member.

* * * * *

UNITED STATES PATENT AND TRADEMARK OFFICE
CERTIFICATE OF CORRECTION

PATENT NO. : 4,790,701

DATED : December 13, 1988

INVENTOR(S) : Richard C. Baubles

It is certified that error appears in the above-identified patent and that said Letters Patent is hereby corrected as shown below:

Title page, item [57],
Abstract, line 16: "presnet" should read --prevent--.

Column 4, line 54: "simplified" should read --simplifies--.

Column 5, line 14: "47 50" should read --47-50--.

Column 5, line 19: "side" should read --sides--.

Column 6, line 65 (Claim 1, line 33): "portion shaving" should read --portions having--.

Column 7, line 68 (Claim 8, line 2): "or" (first occurrence) should read --of--.

Column 8, line 10 (Claim 10, line 2): "tow" should read --two--.

Column 8, line 24 (Claim 10, line 16): "cpativated" should read --captivated--.

Column 9, line 14 (Claim 12, line 6): "exstent" should read --extent--.

Column 9, line 32 (Claim 14, line 4): delete the second occurrence of "portion".

UNITED STATES PATENT AND TRADEMARK OFFICE
CERTIFICATE OF CORRECTION

PATENT NO. : 4,790,701

DATED : December 13, 1988

INVENTOR(S) : Richard C. Baubles

It is certified that error appears in the above-identified patent and that said Letters Patent is hereby corrected as shown below:

Column 11, line 12 (Claim 23, line 2): "wherien" should read --wherein--.

Column 12, line 19 (Claim 24, line 37): "taht" should read --that--.

Signed and Sealed this

Twenty-fifth Day of December, 1990

*Attest:*

HARRY F. MANBECK, JR.

*Attesting Officer*      *Commissioner of Patents and Trademarks*